(No Model.)
J. F. HOLLOWAY.
Mechanism for Moving the Cranks of Engine and other Shafts from off their Dead Centers.
No. 237,020.  Patented Jan. 25, 1881.
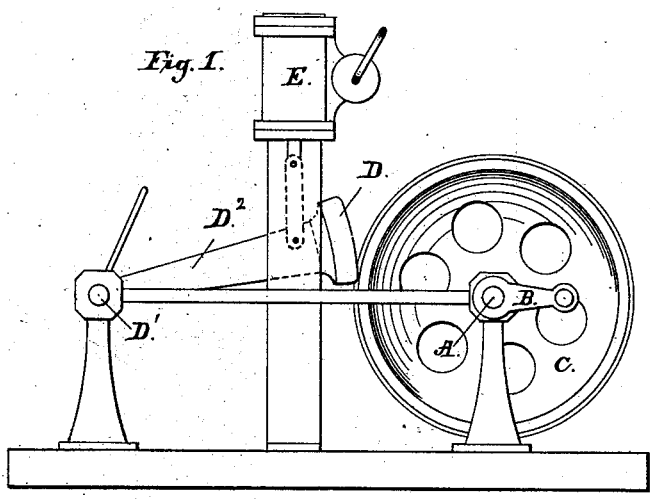
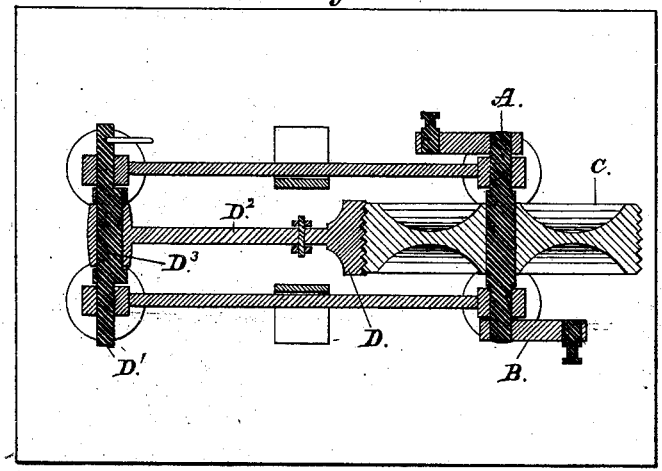
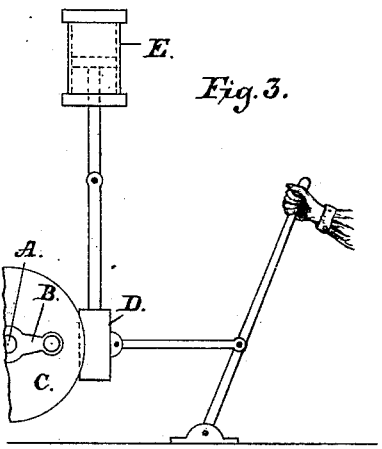
WITNESSES
Albert L. Lord
Jno. Crowell Jr.
INVENTOR
Josephus F. Holloway
By Leggett & Leggett
ATTORNEYS

UNITED STATES PATENT OFFICE.

JOSEPHUS F. HOLLOWAY, OF CLEVELAND, OHIO.

MECHANISM FOR MOVING THE CRANKS OF ENGINE AND OTHER SHAFTS FROM OFF THEIR DEAD-CENTERS.

SPECIFICATION forming part of Letters Patent No. 237,020, dated January 25, 1881.

Application filed December 10, 1880. (No model.)

*To all whom it may concern:*

Be it known that I, JOSEPHUS F. HOLLOWAY, of Cleveland, in the county of Cuyahoga and State of Ohio, have invented certain new and useful Improvements in Mechanism for Moving the Cranks of Engine and other Shafts from off their Dead-Centers; and I do hereby declare the following to be a full, clear, and exact description of the invention, such as will enable others skilled in the art to which it pertains to make and use it, reference being had to the accompanying drawings, which form part of this specification.

My invention relates to a device for moving cranks off from a dead-center; and it consists, substantially, in the following specified friction apparatus, whereby the crank-shaft may be given a slight rotary movement sufficient for the purpose above named.

In the drawings, Figure 1 is a view, in side elevation, of my invention in one of its forms. Fig. 2 is a plan view of the same with the actuating steam-cylinder removed, and Fig. 3 represents a modification of which my device is susceptible.

A represents the shaft revolved by the crank B, and this crank is to be actuated by the pitman of a steam-engine, or any other source of power.

That which is termed the "dead-points" of a crank is a matter too well understood to necessitate any description here. When a crank stops upon either of its dead-points all that is necessary is, that it should be slightly moved therefrom, in order that the motive power impelling it may be able to act. This can be done either by power applied to the crank itself, or by a rotation of the shaft to which the crank is keyed.

My invention has for its object a slight rotation of the shaft A, and to accomplish this I employ substantially the following mechanism:

I fix rigidly upon the shaft A a friction drum or wheel, C. The surface of the wheel or drum C may be constructed in any manner best adapted to offer the required amount of friction; and to this end it may be made corrugated or notched, as indicated in the drawings, or it may be roughened or clothed with rubber, leather, or any equivalent substance.

D is what I term a "starter." This is formed, preferably, in counterpart of the shape of the friction-surface of the drum or wheel C, and, like said drum or wheel, it may be made notched or corrugated, or roughened or clothed with any material that will offer considerable friction. The two elements C and D constitute the principal features of my invention.

If the starter D, while in frictional contact with the wheel or drum C, is moved, it will carry with it the wheel C so long as there is frictional contact between them, and this frictional contact can be regulated by the length of the starter D or by the time that it is allowed to remain in frictional contact with the wheel C.

The operation of the device illustrated in Fig. 1 of the drawings is as follows: Supposing the crank B to be upon one of its dead-points in the position illustrated, the starter D is brought into frictional contact with the drum or wheel C, and, through the force of the piston of the cylinder E, is forcibly driven down. In such a device as illustrated in the drawings referred to, the starter will be driven down to a length corresponding to the stroke of said piston. This movement of the starter D will impart a rotary movement to the wheel or drum C and to the shaft A, thereby moving the crank B off from its dead-center.

As regards the construction of the starter D, I do not narrowly limit myself. As illustrated in Fig. 1 of the drawings, it may have the form of the segment of a circle concentric with the axis D of the arm $D^2$, which carries it. Instead of being formed on the arc of a circle, however, the starter may have a straight or plain surface and move rectilinearly through suitable guides or otherwise, as illustrated in Fig. 3 of the drawings.

In the two forms just described the starter D must be made adjustable to and from the drum or wheel C, so that frictional contact may be had or relieved at pleasure.

If the form of device suggested in Fig. 1 is employed, the arm $D^2$ may be connected with its axis $D'$ through a cam or eccentric, $D^3$, by means of which the starter D may be moved toward or from the wheel C.

If the modification suggested in Fig. 3 of the drawings be adopted, anything that will operate to make or break contact between the starter D and wheel or drum C may be employed.

Fig. 3 of the drawings illustrates how a cylinder and piston may be utilized for this purpose.

What I claim is—

1. The combination, with a crank-shaft having a friction drum or wheel secured thereto, of a starter, D, and devices for forcing said starter snugly against the periphery of the friction drum or wheel, and imparting a partial rotary movement to the crank-shaft, substantially as set forth.

2. The combination, with a crank-shaft having a friction drum or wheel secured thereto, of a starter, D, and devices for utilizing steam or hydraulic power to actuate the starter and impart a partial rotary motion to the crank-shaft, substantially as set forth.

3. The combination, with a crank-shaft having a friction drum or wheel secured thereto, of a starter, D, a power-cylinder, and a link connecting the piston-rod and starter, substantially as set forth.

4. The combination, with a crank-shaft having a friction drum or wheel secured thereto, of a starter, D, connected with a vibrating arm, and a steam or hydraulic actuated piston for imparting movement to the vibrating arm and starter, substantially as set forth.

5. The combination, with a crank-shaft having a friction drum or wheel secured thereto, of a starter, D, connected with a vibrating arm, and an eccentric journal-bearing for said vibrating arm, substantially as set forth.

6. The combination, with a crank-shaft having a friction drum or wheel secured thereto, of a starter, D, connected with a vibrating arm, and a steam-actuated piston for raising and depressing the starter, substantially as set forth.

In testimony whereof I have signed my name to this specification in the presence of two subscribing witnesses.

JOSEPHUS F. HOLLOWAY.

Witnesses:
  JNO. CROWELL, Jr.,
  W. E. DONNELLY.